Oct. 24, 1939.   J. E. MILLER   2,177,438
PIPE CONNECTION
Filed June 15, 1938
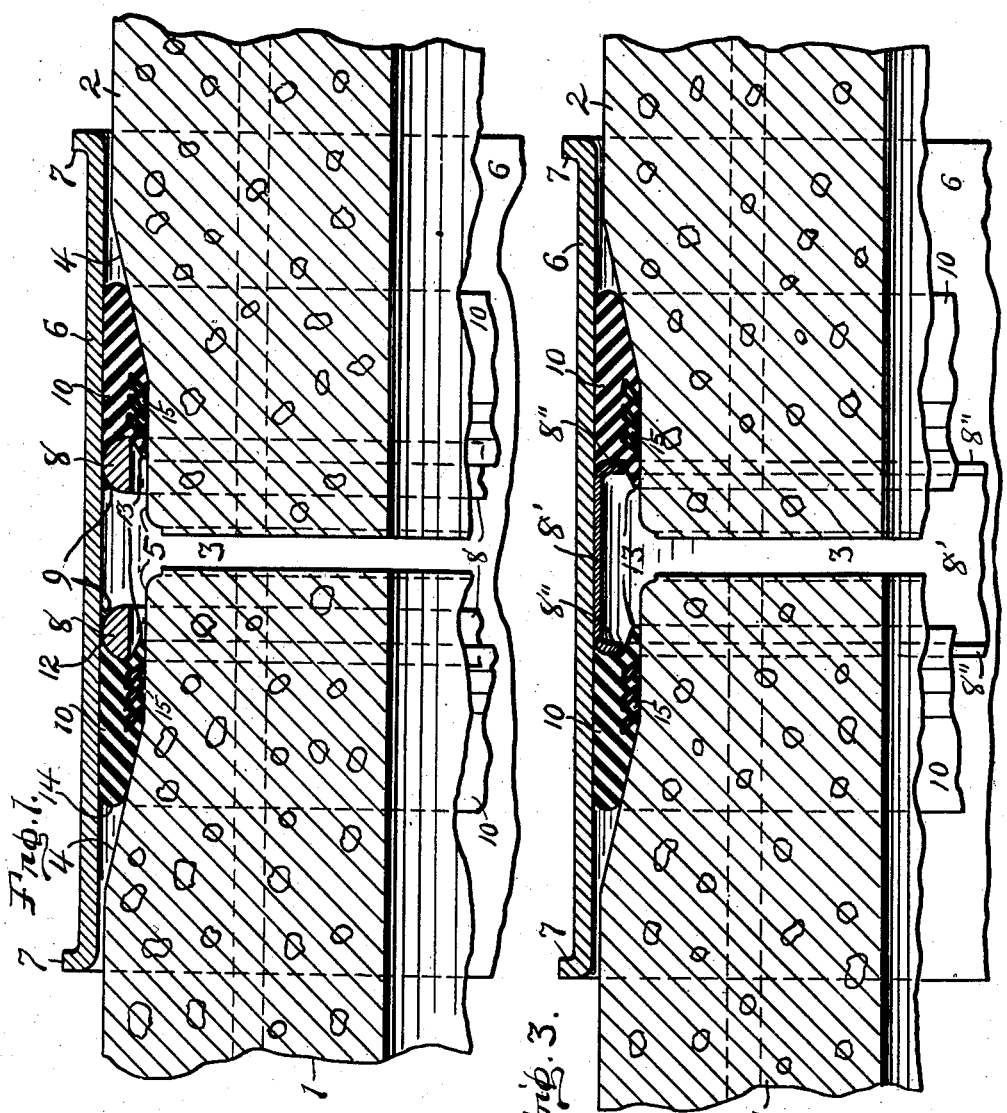
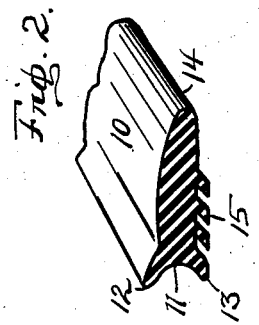
INVENTOR.
Joseph E. Miller
BY
A. G. Burns ATTORNEY.

Patented Oct. 24, 1939

2,177,438

UNITED STATES PATENT OFFICE 2,177,438

PIPE CONNECTION

Joseph E. Miller, Oak Park, Ill.

Application June 15, 1938, Serial No. 213,873

3 Claims. (Cl. 285—193)

This invention relates to a pipe connection in which pipes are coupled together in axial alinement by such means as to prevent leakage from between the connected pipes.

An object of the invention is to so form the end portions of the pipes to be connected and the members forming the coupling for connecting the pipes that pressure of fluid when established within the coupled pipes will automatically cause tightening of the joints formed between the coupling elements and the pipes.

Another object of the invention is to form the end portions of the pipes, the coupling member therefor and the pack-rings, by which the coupling member and the pipe ends connected thereby are sealed, so that during the operation of assembling the pipe ends with the pack-rings and connecting member, said pack-rings become compressed uniformly around the corresponding pipes within the coupling member when mechanical force is applied to move said pipes, when axially alined, toward each other.

Other objects and advantages of the invention will appear in the following description.

An illustrative embodiment of the invention is shown in the accompanying drawing, in which:

Fig. 1 is a fragmentary longitudinal section of a pipe connection in which the invention is employed;

Fig. 2 is a fragmentary perspective view illustrating the cross-sectional form of a resilient pack used in sealing the coupling member with the connected pipes; and Fig. 3 is a fragmentary longitudinal section of the pipe connection in modified form.

The illustrative embodiment of the invention, preferably, as shown in Fig. 1, consists of pipes 1 and 2 that are disposed in axial alinement, there being a suitable space 3 therebetween.

The end portion of each pipe is formed with an annular frusto-conical shoulder 4 that tapers uniformly throughout its length and terminates at its outer end a suitable distance from the pipe end. That part 5 of the pipe between the shoulder and the end of the pipe is substantially straight and of reduced circumference with respect to the main body of the pipe. A coupling member is provided that consists of a metallic encircling cylindrical band 6 the ends of which have external flanges 7, the inner bore of the band being slightly greater than the exterior diameter of the pipes whereby to permit ready entrance of the pipes into the ends of the band during assemblage thereof. Within the band are secured stop-rings 8 disposed concentrically with respect to the band that are permanently secured in place therein, preferably by welding the rings to the band as indicated by 9. Resilient packs are provided each of which consists of a ring 10 preferably formed of rubber shaped with a curved groove 11 in one end to provide spaced lips 12 and 13, the opposite end of the ring being tapered to a rounded edge 14, and the bottom having a series of concentric annular fins 15 that are integral with said ring.

The packs are placed in the band 6 concentrically therewith, their grooved ends disposed against the outermost edges of the corresponding stop-rings 8, and with their lips 13 projecting into the bores of the rings where they are held initially in place by their frictional contacts with the inner wall of the band and the corresponding frusto-conical shoulders on the pipes.

In assembling the parts to form the connection, the band, while containing therein the packs, after one of the pipes is installed in place, the band is centered in axial alinement with the installed pipe and then moved axially so that the end of said installed pipe is encompassed by the corresponding end of the band, as well as by the pack and stop-ring therein. By applying force mechanically, to the opposite end of the band in the direction to move the band onto the installed pipe, the pack becomes tightly wedged between the frusto-conical shoulder 4 and the inner wall of the band, and the corresponding stop-ring is concurrently thrust against the grooved end of the pack. Thus, the pack is tightly and uniformly compressed between the shoulder and the inner wall of the band, causing the fins 15 to become compressed against the pipe, and the outer circumferential face of the pack to be jammed against the inner wall of the band.

As the pressure applied to the pack is more or less uniform as movement of the stop-ring is exerted axially against the pack, compression of the pack between the shoulder and the band is likewise substantially uniform entirely around the shoulder and against the band. The pressure of the pack thus is applied radially between the shoulder and the band and is substantially uniform entirely around the pipe which causes the band to assume true concentricity with the pipe, even though the band may be initially somewhat out of round. This permits the resilient pack to adjust itself uniformly in place around the pipe end so as to form a seal between the pipe and band as well as against the stop members whereby leakage of fluid past the seal is equally resisted at all points. As the taper of the shoulder 4 presents a continuously unobstructed surface throughout its entire length, restraint to movement of the sealing pack 10 onto the shoulder is universally equal around the entire circumference thereof and thus the effectiveness of the seal at all points is uniform.

The end of the opposing pipe is then inserted into the corresponding end of the band, and forced into place within the corresponding pack and stop-ring, so that a similar seal is formed between said opposing pipe and the band, thus completing the pipe connection.

In the modification shown in Fig. 3, the band is of the same form as the band 6 previously described. The stop member in the modified form, however, consists of an annular channel 8' having end flanges 8" and fits loosely within the bore of the band, or, if preferred, it may be welded or otherwise permanently secured in place. In this instance the resilient packs 10 bear against the outer end faces of the channel and are compressed between the outer faces of the frustoconical shoulders and the band, as in the former instance when the assemblage of parts is completed.

In both forms of the invention there are provided resilient packs between the opposed pipe ends and the surrounding band that are initially compressed by mechanical force augmented by hydraulic or fluid pressure subsequently created within the pipes, whereby a substantially leakproof connection is effected.

Variations from the particular construction above disclosed may readily be made by exercise of engineering skill without departure from the spirit or scope of the invention, and the following claims are intended to be inclusive of such variations.

What I claim is:

1. A coupling for pipes the ends of which have external tapering shoulders, a cylindrical band disposed to encompass the opposing ends of said pipes, and resilient cylindrical packs having in conjunction therewith a stop member disposed within the band between the ends of said packs to prevent axial movement of one pack end toward the other when the ends of said pipes are thrust into said coupling.

2. A pipe connection formed of axially alined pipes the opposing ends thereof being spaced apart, the end portion of each pipe having an external uniformly tapered shoulder, an annular band encompassing the opposing end portions of said pipes and provided with internal annular stops spaced inwardly from the ends of said band, and a resilient annular pack disposed within each end of said band engaged respectively by said stops so that upon travel of one pipe axially toward the other said packs move on the corresponding shoulders and become wedged between said shoulders and band.

3. A pipe connection having axially alined pipes the opposing ends of which are spaced apart, each pipe provided with an annular tapering external shoulder having a continuous unobstructed surface throughout its entire length, and a cylindrical coupling band having therein an annular stop member spaced from the respective ends thereof and provided also with internal annular resilient packs that bear respectively against the opposite ends of said member so that when the ends of said pipes are thrust into the corresponding ends of said band, said packs move on the corresponding shoulders and become wedged in place between the corresponding shoulders and band and held in sealing position thereon under uniform pressure.

JOSEPH E. MILLER.